No. 793,128.

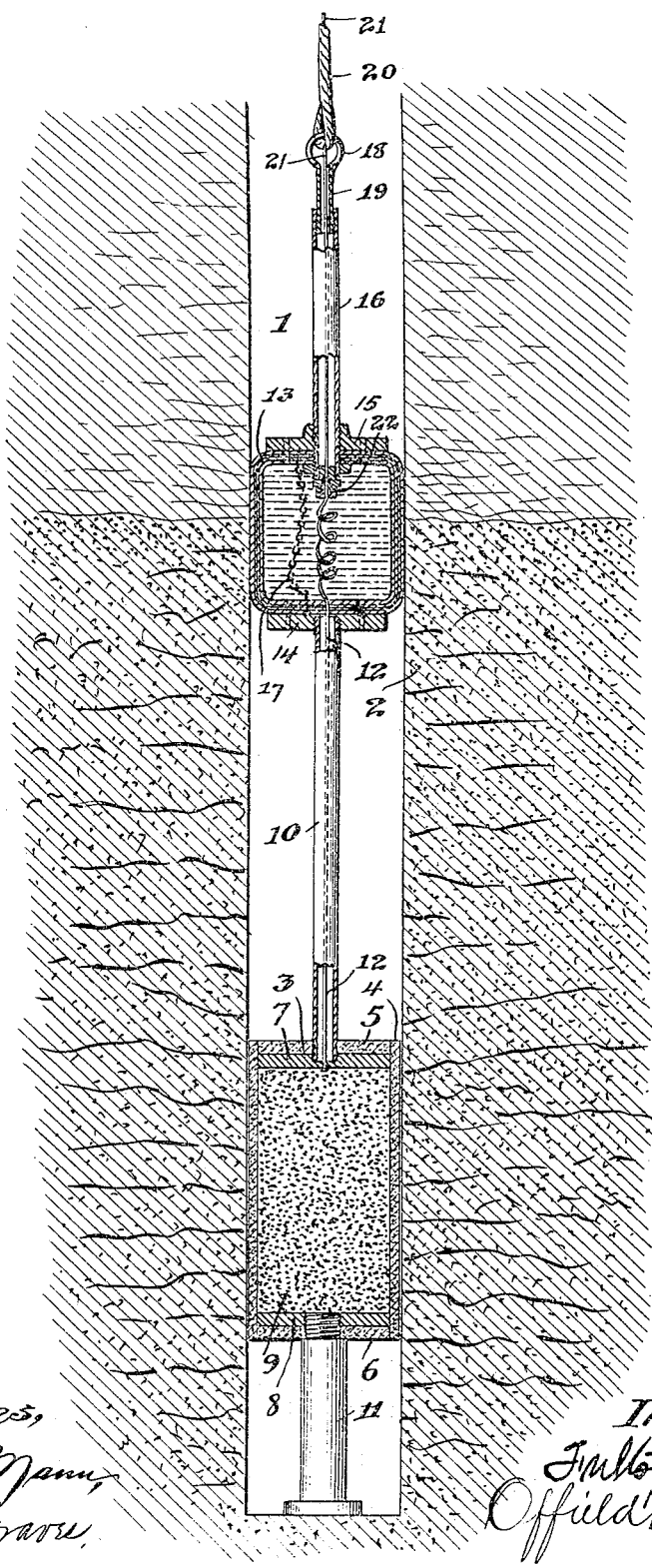
No. 793,128. PATENTED JUNE 27, 1905.
F. GARDNER.
METHOD OF TREATING OIL AND GAS WELLS.
APPLICATION FILED OCT. 31, 1904.

Patented June 27, 1905.

UNITED STATES PATENT OFFICE.

FULTON GARDNER, OF CHICAGO, ILLINOIS, ASSIGNOR OF ONE-HALF TO JULIA B. FOLLETTE, OF CHICAGO, ILLINOIS.

METHOD OF TREATING OIL AND GAS WELLS.

SPECIFICATION forming part of Letters Patent No. 793,128, dated June 27, 1905.

Application filed October 31, 1904. Serial No. 230,782.

*To all whom it may concern:*

Be it known that I, FULTON GARDNER, a resident of Chicago, in the county of Cook and State of Illinois, have invented certain new and useful Improvements in Methods of Treating Oil and Gas Wells to Promote the Flow Thereof, of which the following is a specification.

This invention relates to an improved method or process of promoting the flow of oil and gas in wells.

Among the salient objects of the present invention are to provide a method whereby that part of the well constituting the productive stratum is effectively heated and subjected to steam or vapor pressure, so that the porous and fractured portions of said productive stratum are effectively penetrated by the heat and vapor and the obstructing deposits—such as paraffin, asphaltum, and the like—will be reduced to a fluid condition; to provide an improved method whereby heat and pressure may be confined to substantially that part of the well which constitutes the productive stratum or strata, so that the generated heat and vapors may be most effectively utilized; to provide an improved method which enables an electric heating device to be utilized for producing the requisite heat and vapor pressure, and in general to provide a simple and effective method of the character referred to.

To the above ends the invention consists in the matters hereinafter described, and more particularly pointed out in the appended claims.

In carrying out my improved method in the preferred manner I utilize an electric heater, which is introduced to the bottom of the well or that part thereof which constitutes the productive stratum, and insert a suitable packer or closure in the well at some point above said heater, preferably at a point approximately coincident with the upper edge of said productive stratum, and then pass an electric current through said heater, whereby heat and vapor are generated in the sealed-off part of the well. This heating operation is continued until a high pressure and considerable degree of heat have been developed, the object being to cause the hot vapors to impregnate and penetrate the walls of the well to a considerable distance. In the case of wells which have been "shot"—*i. e.*, those in which the bearing stratum has been shattered by an explosive, as is usually done—the hot vapors thus generated under high pressure are forced to penetrate the fractures to a considerable distance, and by maintaining the heat and pressure for a considerable period of time the surrounding walls of the well are brought to such a temperature that the paraffin, asphaltum, or other clogging substance amenable to heat are melted and the pores and fractures thus cleared.

The practical operation of my method may be more readily understood by a description of the same in conjunction with the use of one practical form of apparatus whereby it may be carried out.

Referring to the drawing, 1 designates as a whole the lower portion of a well, and 2 the production stratum within which the lower end of the well terminates.

3 designates as a whole an electrically-heated cartridge, which is heated by the resistance due to passing a current of electricity therethrough. Said heating device comprises an outer tubular shell 4, of refractory material capable of withstanding a high degree of heat, end closures 5 and 6, respectively, likewise of refractory material, a pair of metal electrodes 7 and 8, arranged inside of said end closures at the respective ends of the cartridge, and a filling of porous refractory material 9, which may be a carbonaceous compound, such as graphite.

As a means of introducing and supporting the cartridge, the latter is connected to the lower end of a section of tubing 10 and is provided at its lower end with a supporting rod or tube 11, whereby it is maintained a short distance above the bottom of the well. An electric conductor 12 leads downwardly through the tube-section 10 to and is connected with the electrode 7, which latter serves as a means of distributing the current to the refractory filling 9. In the preferred way of carrying out my method I use a grounded circuit, and accordingly the support or standard 11 is extended through the lower wall of the cartridge and connected with the electrode 8, thus forming a grounded conductor.

In order to provide a closure for the well at a point above the heating device, I employ a hollow rubber or rubber-coated fabric bag 13, the lower end of which is suitably connected to a disk or support 14, mounted upon the upper end of the tube-section 10. The upper end of said bag is similarly connected with a disk 15, mounted upon the lower end of a tube-section 16, and the two disks 14 and 15, which constitute, in effect, compression-disks, are united with each other by means of a chain or analogous flexible but non-extensible connection 17. Preferably, also, the interior of the bag is filled with water or other suitable liquid, it being understood that the bag is of sealed construction. To the upper end of the pipe-section 16 is connected an eye 18, having a tubular shank 19, which connects with the tube-section 16 and serves as a means of conveniently attaching the supporting-cable 20, whereby the apparatus is lowered into the well. Preferably the cable is made to serve also as an electrical conductor for conveying current to the cartridge, and to this end said cable is provided with a metallic core 21 constituting such conductor, the core or conductor emerging from the loop of the cable at its point of connection with the eye 18 and extending thence down through the tubular shank 19, tube-section 16, and into the bag 13. At a suitable point—as, for example, at the entrance to the bag 13—the conductor is surrounded by a suitable packing-gland 22. The conductor 21 is continued through the bag 13, being coiled therein or made of somewhat greater length than the length of the chain 17 and continues down through the lower side of the bag and thence to the electrode 7 through the tube-section 10.

In carrying out my method by the use of this apparatus I lower the apparatus as a whole to the bottom of the well, and as the standard or anchor 11 engages the end of the bore and arrests the further descent of the cartridge the weight of the superstructure coming upon the bag 13 through the disk 15 expands the latter into close contact with the walls of the well, thereby effectually sealing the bore of the latter. Current is then sent through the conductor 21, such current being derived from a dynamo or other suitable source of generation and passing through the refractory compound 9 escapes through the grounded conductor 11. It will be understood that oil and gas wells invariably contain more or less fluid, it being almost invariably the case that the bottom of the well is occupied by water. The current thus sent through the cartridge rapidly raises the latter to a high degree of heat, thus converting the surrounding liquid into vapor, and since this part of the well is sealed by the closure 13 a high pressure is generated which causes the vapors to penetrate the surrounding walls of the well, as hereinbefore described.

While I have herein shown and described what I deem to be a preferred manner and means of carrying out my invention, yet it will be understood that the method may be modified without departing from the invention, and I do not, therefore, limit myself to exact details, except to such extent as such details are made the subject of specific claims.

I claim as my invention—

1. The method of treating oil and gas wells to promote the flow thereof, which consists in introducing a closure at a point above the bottom of the well, then by suitable means generating a continued heat below said closure and thereby subjecting the walls of the well below said packing to the combined action of heat and pressure.

2. The method of treating oil and gas wells to promote the flow thereof, which consists in introducing an electric heating device in the productive strata of the well, fixing a closure in the well above said heating device, sending electrical current through said heating device and subjecting the sealed part of the well to the combined action of heat and vapor pressure thus generated.

FULTON GARDNER.

Witnesses:
ALBERT H. GRAVES,
FREDERICK C. GOODWIN.